June 5, 1951  R. W. GLASER ET AL  2,556,080
MILK COOLER
Filed July 29, 1949

INVENTORS
EDGAR J. OLSON
ANDREW OLSON
ROY W. GLASER
BY
ATTORNEYS

Patented June 5, 1951

2,556,080

UNITED STATES PATENT OFFICE 2,556,080

MILK COOLER

Roy W. Glaser, Andrew Olson, and Edgar J. Olson, Burlington, Wis.

Application July 29, 1949, Serial No. 107,486

4 Claims. (Cl. 31—4)

1

This invention appertains to a novel device for cooling, aerating and deodorizing liquids, such as milk, and is an improvement over our prior Patent No. 2,060,496, issued to us November 10, 1936.

One of the primary objects of our present invention is to provide a rotor for the milk agitator embodying a novel umbrella shaped head and skirt, defining an interior air pressure chamber for separating the air from the water utilized for actuating the rotor, and for cooling and washing the air and for directing the separated, cooled and washed air into the milk receptacle through a series of ports in the axial extension or hub for the bearing for the rotor and agitator shaft.

Another salient object of the invention is to provide a water seal between the hood for the rotor and the body of the cooler to prevent contamination of the cooling air and for distributing the cold water for the milk can evenly over the outer face thereof.

A further important object of the invention is to provide means for creating pressure on the water in the trough, whereby the water will be forced from the trough through distributing openings in the nature of a spray around the can.

A further object of the invention is to provide means whereby the agitator and its shaft can be quickly detached from the rotor whereby the agitator and the shaft can be conveniently sterilized.

A still further object of the invention is to provide a novel milk can attachment for cooling, aerating and deodorizing milk, which will be rugged in construction yet light in weight, and one which can be quickly and easily connected to or detached from the neck of a milk can.

Figure 1:
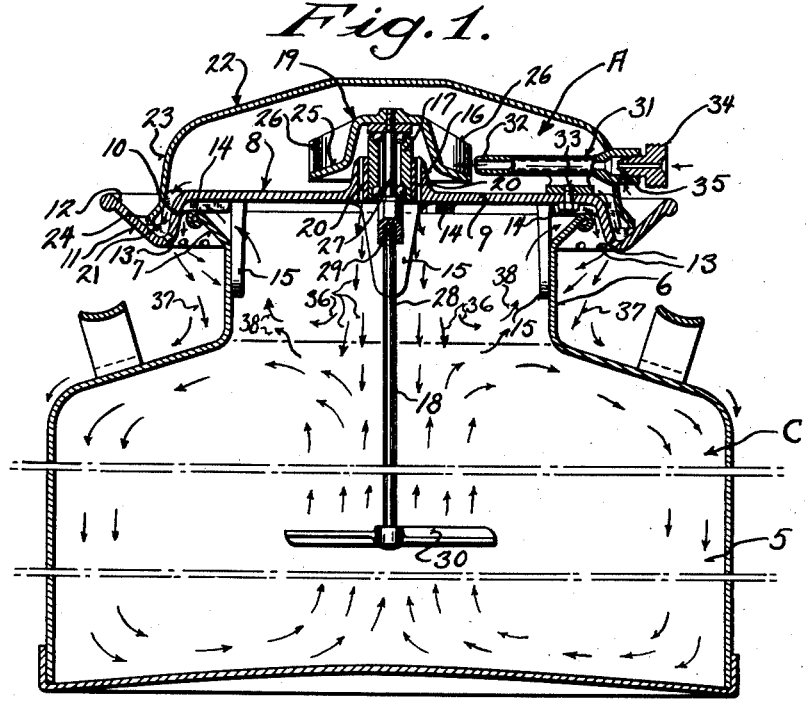
Figure 2:
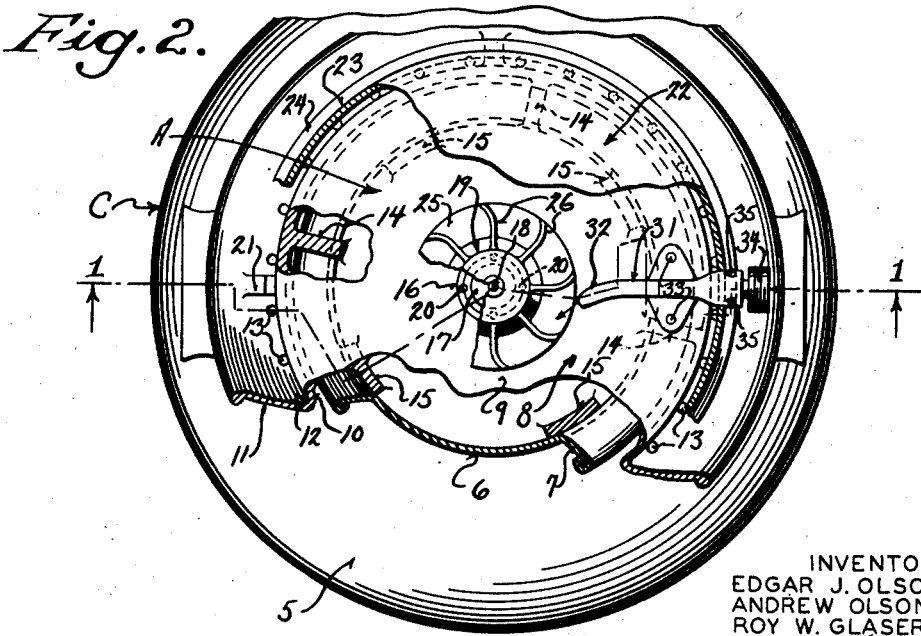

With these and other objects in view, the invention consists in the novel construction, arrangement and formation of parts, as will be hereinafter more specifically described and claimed and illustrated in the accompanying drawing, in which drawing, Figure 1 is a vertical sectional view taken on the line 1—1 of Figure 2, showing the improved device in use on a milk can.

Figure 2 is a top plan view of the novel device on a milk can with parts of the figure shown broken away and in section to illustrate structural detail.

Referring to the drawing in detail, wherein similar reference characters designate corresponding parts throughout the two figures, the letter A generally indicates our novel attachment for cooling, aerating and deodorizing the contents of a milk can C.

While we have shown our device associated with a milk can, it is to be understood that the same can be used with other types of liquid receptacles. The milk can C is of the general character now in use by farmers and dairies and includes the body 5, the neck 6 and the flaring throat or neck flange 7.

The novel attachment A comprises a main body portion 8, for fitting over the milk can and this body portion can be in the nature of a casting and includes a disc shaped plate 9, having a peripheral depending flange 10. The lower end of the flange carries the outwardly and upwardly extending inclined outer wall 11, which terminates slightly below the upper face of the plate 9. The flange 10 and the wall 11, define a water receiving trough 12, of a substantially V-shape in cross section. A plurality of equidistantly spaced water outlet openings 13, is formed in the trough at the point of juncture of the flange 10 and the outer wall 11, and it is to be noted that these openings are directed inwardly. Formed on the lower face of the plate 9 at the outer edge thereof, is a plurality of depending spaced ribs 14. The ribs extend radially of the plate and join the flange 10 and function as a reinforcement for the flange and for fitting upon the top of the throat or neck of the milk can. This spaces the plate 9 from the lip of the neck of the milk can and provides air escape passageways, the purpose of which will be later set forth. It can be seen by referring to Figure 1, that the internal diameter of the flange 10 is greater than the external diameter of the throat of the neck so that the said flange will be spaced from the neck to permit the escape of air. In order to center the body 8 of the cooler on the can, the plate 9 also has formed thereon at spaced points depending arms 15, and these arms engage the interior of the neck. The arms 15 are equidistantly spaced from the axial center of the plate.

The central portion of the plate has formed thereon the upwardly directed axial extension or bearing hub 16. The hub receives the bearing 17 for the agitator shaft 18 and the rotor 19. Formed in the extension 16 around the bearing 17 is a plurality of air inlet openings, the purpose of which will also be hereinafter more fully set forth.

Formed on the exterior of the body 8, are spacing lugs 21, and these lugs 21 extend down the flange 10 to the wall 11 and form a reinforcement for the flange 10 and the wall 11 and for supporting the closure and protecting hood 22. This hood 22 is of a dome shape and includes an annular depending side wall 23 terminating in a flared depending flange 24. The flange rests upon the lower portions of the lugs 21 and the inner face of the wall 23 engages upper portions of the lugs. Obviously, the lugs, thus effectively space the bottom of the hood from the bottom of the trough and as the bottom of the hood extends into the trough, the same will form in conjunction therewith, when the hood is filled with water, a water seal and water can flow into the trough between the lugs 21.

Particular attention is now directed to the rotor 19 and the same includes a rotor head of a substantially umbrella shape and the head terminates in a downwardly and outwardly inclined annular skirt 25. Formed on the head and the skirt 25, are the buckets or vanes 26 against which the actuating water is adapted to impinge. The agitator shaft is connected to the axial center of the rotor and extends through the bearing 17. It is to be noted that the agitator shaft includes an upper section 27 and a lower section 28. The sections are connected by screw threads as at 29. The extreme lower end of the section 28, has rigidly secured thereto the agitator or propeller 30, which extends into the milk can adjacent to, but spaced from, the bottom wall of the can. By unthreading the section 28 from the section 27, the section 28 and agitator 30 can be conveniently sterilized.

The rotor 19 forms a part of a water motor and the water motor also includes an injector 31. The injector 31 includes an outlet nozzle 32 for directing a jet of water against the vanes or buckets 26 of the rotor to cause the rapid rotation thereof. The nozzle 32 can be detachably connected to the plate 9 by means of bolts 33 and the rear end of the nozzle extends exteriorly of the cooler through the hood 22. Threaded into the outer end of the nozzle is the restricted water inlet nipple 34 and this nipple is connected to a water supply line (not shown). The water is under pressure to insure the proper flow thereof. It is to be understood that the pressure can be low, namely around 3 to 6 pounds. The outer end of the nozzle around the restricted inlet 34 has formed therein air inlet ports 35. Hence when water under pressure is injected into the nozzle 32, a suction will be created in the rear end of the nozzle around the restricted water inlet and air will be drawn into the nozzle and will be forced out of the nozzle with the water against the rotor. This is important, as will be now set forth. Considering that the can C is filled with milk to the desired level, the device A, is fitted on the upper end thereof as is clearly shown in the drawing. The water under pressure is allowed to flow through the nozzle onto the rotor and air will be forced into the hood. The impinging of the water against the buckets or vanes 26 will bring about the rotation of the rotor and consequently the agitator. The paddles of the agitator draw the milk in the can to the center of the can at the bottom thereof, and then up the middle and back down the side wall of the can in a continuous rolling, spiral motion. Upon the rotation of the rotor and the injection of the air in the hood, a pressure will be created on the interior of the rotor. The water flowing over the rotor washes and cools the incoming air and the air separates from the water and flows under the rotor and into the can through the ports 20, as indicated by the arrows 36. As the milk is being agitated, the same is brought into direct contact with the fresh, cooled, washed air. As the cool, fresh air makes contact with the milk and is drawn into the same, the milk is aerated and this air and the flow of milk past the sides of the can, which are continuously cooled, as will be later set forth, causes the temperature of the milk to rapidly drop. The water flowing off the rotor flows onto and over the plate 9 of the body of the cooler and continuously cools the plate and the water then flows into the trough 12. Due to the air pressure within the hood, there is a pressure on the water in the trough and the water is forced through the outlet openings in the trough. Consequently, the water is directed in the nature of sprays evenly over the outside of the can as indicated by the arrows 37. This water cools the outer surface of the can.

Upon the entrance of the cool air with the milk, the air displaces the hot fumes from the milk and these fumes escape from the center of the milk can as indicated by the arrows 38, and these fumes flow over the upper lip of the milk can and under the flange 10.

From the foregoing description, it can be seen that we have provided a novel and simple appliance for quickly cooling, aerating and deodorizing milk in milk cans.

Changes in details may be made without departing from the spirit or the scope of this invention, but what we claim as new is:

1. A device for cooling, aerating and deodorizing milk in milk cans comprising a body portion having a peripheral trough and an axially disposed upright bearing extension having ports for air therein, a rotor and shaft supported by the bearing extension, an agitator on said shaft, means on the body for spacing the body and the trough from the lip of a milk can, a hood for the body enclosing the rotor having its lower edge extended into the trough, means for spacing the edge of the hood from the walls of the trough and an injector for the rotor extending into the hood.

2. A device for cooling, aerating and deodorizing milk in milk cans comprising a body portion having a peripheral trough and an axially disposed upright bearing extension having ports for air therein, a rotor and shaft supported by the bearing extension, an agitator on said shaft, means on the body for spacing the body and the trough from the lip of a milk can, a hood for the body enclosing the rotor having its lower edge extended into the trough, means for spacing the edge of the hood from the walls of the trough and an injector for the rotor extending into the hood, said injector including a nozzle, a restricted water inlet nipple communicating with the rear end of the nozzle and said nozzle having air inlet openings around the nipple to permit the entrance of air into said nozzle, whereby water and fresh air will be impinged against the rotor.

3. A device for cooling, aerating and deodorizing milk in milk cans comprising a body portion having a peripheral trough and an axially disposed upright bearing extension having ports for air therein, a rotor and shaft supported by the bearing extension, an agitator on said shaft, means on the body for spacing the body and the trough from the lip of a milk can, a hood for the body enclosing the rotor having its lower edge extended into the trough, means for spacing the edge of the hood from the walls of the trough and an injector for the rotor extending into the hood, said injector including a nozzle, a restricted water inlet nipple communicating with the rear end of the nozzle and said nozzle having air inlet openings around the nipple to permit the entrance of air into said nozzle, whereby water and fresh air will be impinged against the rotor, said rotor including a hollow head and a flaring skirt defining an interior chamber for housing the axial body extension and curved vanes, the air upon separating from the water being adapted to flow through the openings in the extension.

4. A liquid cooler, aerator and deodorizer comprising a receptacle containing the liquid to be cooled having a neck, a body detachably associated with the neck having a peripheral trough surrounding the neck, means on the body for spacing the same and the trough from the neck, said trough having formed on its bottom inwardly directed openings for the escape of water, an upwardly directed axial extension formed on the body having a plurality of openings therein for the passage of air, a rotor and a rotor shaft rotatably supported by the extension, an agitator disposed within the receptacle carried by the shaft, said rotor including a hollow head and a flaring skirt housing the extension, a hood enclosing the rotor having its lower edge received in the trough, means in the trough for spacing said edge from the bottom of the trough and an injector in said hood including a nozzle directed toward the rotor, the outer end of the nozzle extending outward of the hood and having an interior enlarged chamber, a restricted water inlet nipple extending into said chamber, and the rear end of the nozzle around the restricted water inlet nipple having air inlet openings communicating with the chamber, whereby water and fresh air will be impinged against the rotor.

ROY W. GLASER.
ANDREW OLSON.
EDGAR J. OLSON.

REFERENCES CITED

The following references are of record in the file of this patent:

UNITED STATES PATENTS

| Number | Name | Date |
|---|---|---|
| 1,838,610 | Bodes | Dec. 29, 1931 |
| 2,026,090 | Hiller | Dec. 31, 1935 |
| 2,048,078 | Moore | July 21, 1936 |
| 2,060,496 | Glaser et al. | Nov. 10, 1936 |
| 2,189,146 | Little | Feb. 6, 1940 |